March 24, 1959 — I. JEPSON — 2,878,940
FILTER ASSEMBLY
Filed May 4, 1954 — 3 Sheets-Sheet 2
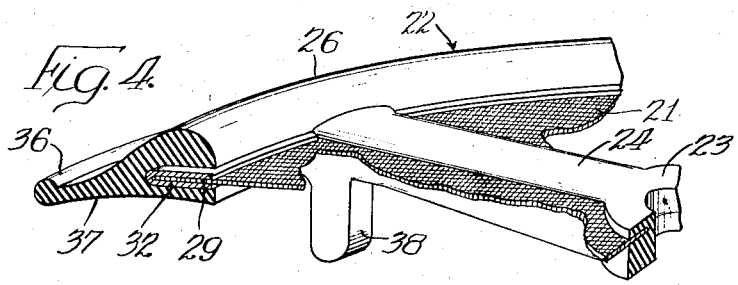
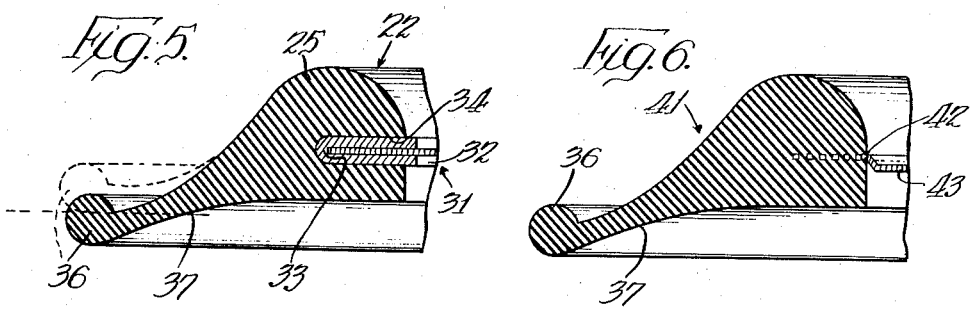
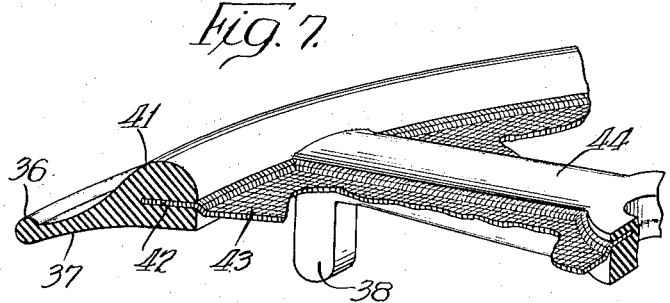
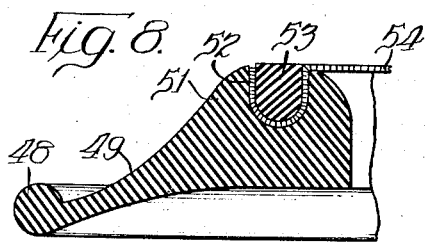
INVENTOR.
Ivar Jepson
BY
Mason, Kolehmainen, Rathburn & Wyss
Attys.

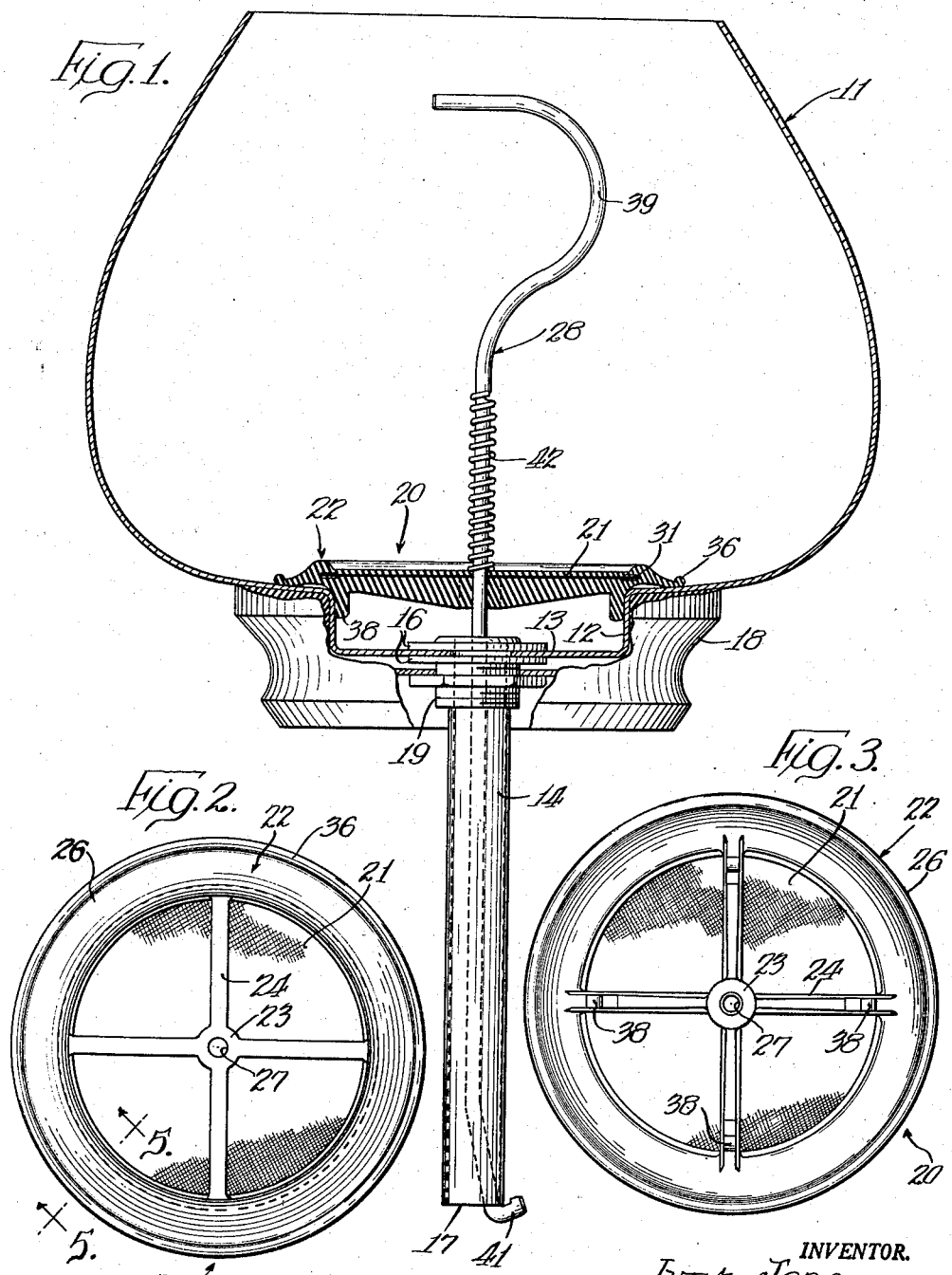

March 24, 1959
I. JEPSON
2,878,940
FILTER ASSEMBLY
Filed May 4, 1954
3 Sheets-Sheet 3
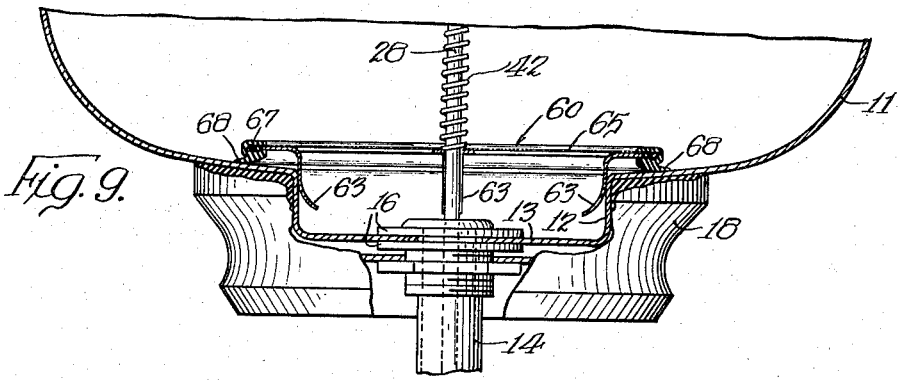
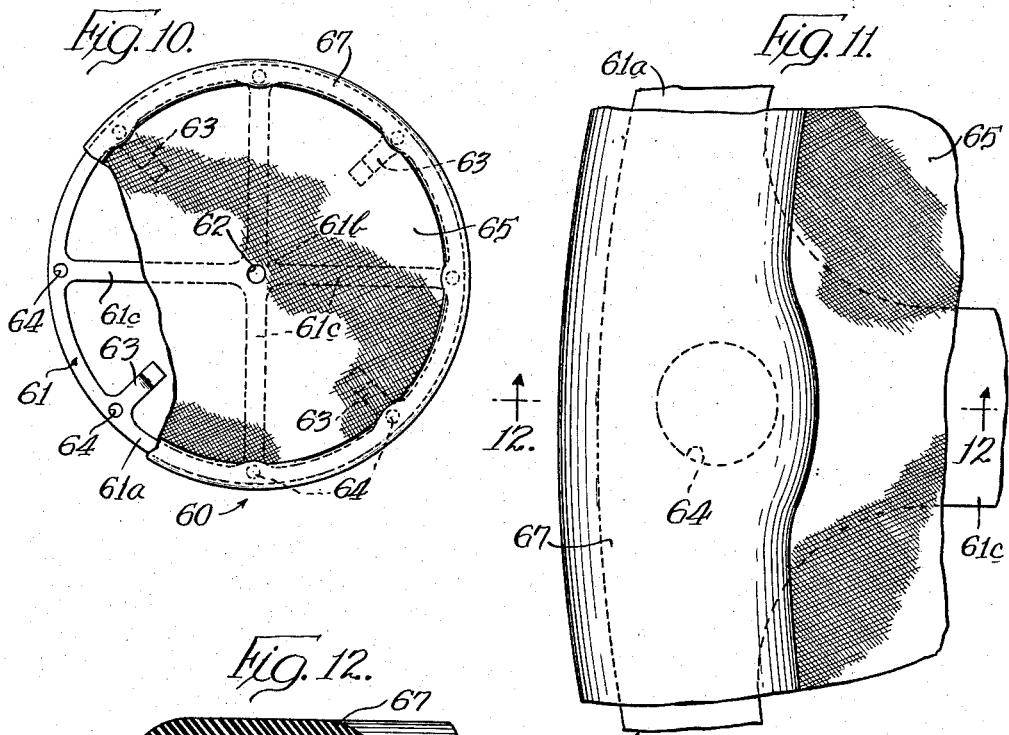
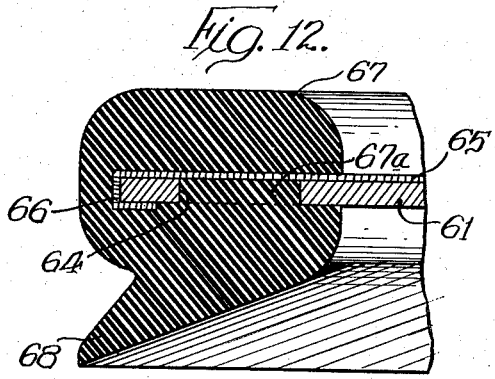
INVENTOR.
Ivar Jepson
BY
Mason, Kolehmainen, Rathburn & Wyss
Attys

# United States Patent Office 2,878,940
Patented Mar. 24, 1959

2,878,940

FILTER ASSEMBLY

Ivar Jepson, Oak Park, Ill., assignor to Sunbeam Corporation, Chicago, Ill., a corporation of Illinois Application May 4, 1954, Serial No. 427,437

10 Claims. (Cl. 210—238)

The present invention relates to filters and filter assemblies for use with coffee makers, and primarily for use with coffee makers of the vacuum type. The instant application is a continuation-in-part of Jepson application Serial No. 148,582, filed March 9, 1950 now abandoned.

In coffee makers of the vacuum type, there is usually a lower vessel within which water is heated and an upper vessel within which the coffee grounds to be infused are placed. A filter is necessary between the two vessels to permit the water first to move from the lower to the upper vessel and then to permit the coffee liquor to return to the lower vessel while retaining the coffee grounds in the upper vessel at all times. Prior filters for such vacuum type coffee makers have not been completely satisfactory in all respects. In some instances the filters have been formed by an elongated piece of glass or ceramic material having an enlarged portion with a roughened surface shaped to seat in a throat portion of the upper vessel of the coffee maker. Such filters do not laways seat properly and, consequently, are not positive in their filtering action with the result that frequently coffee grounds pass from the upper to the lower vessel. Too, such filters are hard to clean, since particles of coffee seat in the bottom of the crevices formed on the roughened surface and tend to cling thereto. Another disadvantage of such filters is that they are extremely delicate and break quite easily. Consequently, there is a relatively high maintenance cost insofar as such filters are concerned with coffee makers of this type. Other manufacturers have utilized cloth and paper discs mounted on a suitable frame for filtering purposes. The cloth or paper discs must be assembled on the frame in a certain way. Also, the cloth must be removed from the frame before it can be washed and thoroughly cleaned. This, of course, requires that the filter be assembled and disassembled, which takes time and is a bother. Moreover, the component parts of the frame must be individually washed and cleaned. While still other types of filters have been designed and used by other manufacturers, they have not attained widespread usage because they have comprised complicated structures, requiring assembly and disassembly for cleaning, and have been difficult to thoroughly clean in a minimum of time.

Accordingly, an object of the present invention is the provision of a novel filter that may be quickly and easily installed in a coffee maker, provides for an efficient filter action, and that is relatively inexpensive to produce.

Another object of the invention is the provision of a unitary assembly that is rugged, that does not require assembly and disassembly each time the filter is cleaned, that has a long service life, that requires a minimum of maintenance, and that can be quickly, easily and thoroughly cleaned.

Further objects and advantages of the present invention will become apparent as the following description proceeds, and the features of novelty which characterize the invention will be pointed out with particularity in the claims annexed to and forming a part of this specification.

For a better understanding of the present invention reference may be had to the accompanying drawings in which:

Fig. 1 is an elevational view of an upper vessel of a coffee maker utilizing a filter comprising one embodiment of the present invention with portions cut away to show details of construction;

Fig. 2 is a top view of the filter of Fig. 1;

Fig. 3 is a bottom view of the filter of Fig. 1;

Fig. 4 is a fragmentary perspective view of the filter of Fig. 1 showing certain details of construction;

Fig. 5 is an enlarged sectional view taken substantially along the line 5—5 of Fig. 2;

Figs. 6 and 7 are sectional and perspective views similar to Figs. 5 and 4, respectively, showing a modification of the invention;

Fig. 8 is a sectional view similar to Fig. 5 showing another modification of the invention;

Fig. 9 is a fragmentary sectional view of the upper vessel of a vacuum type coffee maker employing a filter embodying still another modification of the present invention;

Fig. 10 is a top plan view, with certain portions cut away, of the filter of Fig. 9, assuming that Fig. 9 shows the complete structure;

Fig. 11 is a greatly enlarged view of a small portion of Fig. 10; and

Fig. 12 is a sectional view taken substantially along line 12—12 of Fig. 11.

Referring now to the drawings, and specifically to Figs. 1 to 5 thereof, the invention is shown embodied in a filter for a coffee maker of the infusion type. To simplify the drawings, only the upper vessel 11 of the latter is shown. The upper vessel is of conventional construction and terminates in a well defined by a circular side wall 12 and a bottom 13. A tube 14 has its upper end connected to the bottom 13 as by spaced flanges 16 secured on the tube and engageable with opposite sides of the bottom 13. The lower end 17 of the tube is in spaced relation to the bottom 13. A gasket 18 encircling the side wall 12 is secured to the bottom of the vessel, as by a lock nut 19 threaded on the tube 14, and insures a liquid-tight seal between the upper vessel 11 and the lower vessel (not shown) of the coffee maker.

To maintain the coffee grounds in the upper vessel, there is provided in accordance with the present invention a filter 20 which includes a screen 21. As shown in this embodiment of the invention, the screen 21 is of a circular shape and may be formed in any suitable manner. It may, for example, be formed by the electrodeposition of material such as described in United States Patent No. 2,166,366. Preferably, however, it is formed of drawn stainless steel wire woven to provide a screen of the order of 200 mesh. While the dimensions of the openings in the screen may vary considerably, a screen formed of stainless steel wire .0025 of an inch in diameter and with 40% or more open space has been found to be very satisfactory.

For the purpose of supporting the screen 21, the filter 20 includes a frame 22 comprising a hub portion 23, annularly spaced radially extending spokes 24, and an annular rim 26. The hub portion 23 is disposed centrally of the circular screen and is formed with an aperture 27 for receiving a filter rod 28. The spokes 24 extend radially outwardly from the hub portion 23 on both sides of the screen and are connected at their outer ends to the rim 26. The spokes 24 are arranged so that they in effect divide the screen into a plurality of annularly arranged segmental filtering areas. The portion of each spoke on the upper surface of the screen is of uniform height above the screen and is preferably rounded as shown in Fig. 4 so as to provide a smooth surface which may be readily cleaned. The cross section of the portion of each spoke on the bottom of the screen tapers progressively from the hub portion to the rim and is of such configuration that it, together with the top portion, provides a relatively rigid supporting member for the screen and rim. As shown in Figs. 4 and 5, the marginal edges 29 of the screen are received in a groove of a screen retaining member 31 defined by spaced annular sides 32 in face to face contact with the screen 21 and joined together at their outer periphery by a bridging portion 33. The spaced sides 32 are deformed into gripping engagement with the marginal edges of the screen 21 to maintain the screen in a taut condition. The retaining member 31 is received in an annular recess 34 on the inner enlarged edge or ring portion 25 of the rim 26.

To provide a satisfactory seal, the rim 26 of the filter 20 on its outer edge is formed with an annular beaded portion 36 in concentric relation with the marginal edges of the screen 21. The beaded portion 36 has a generally circular cross section of relatively small diameter and is normally disposed at one side of or below the plane of the screen as shown in Figs. 4 and 5. The rim also includes an annular resilient web portion 37 interconnecting the inner edge portion 25 and the beaded portion 36 of the body. As shown in Fig. 5, the web portion 37 is of a relatively thin cross section and tapers generally from its connection with the inner edge portion 25 to its connection with the lower edge of the beaded portion 36. The shape of the web portion 37 is such that the beaded portion 36 and the inner portion 25 may be moved relative to each other, as shown by dotted lines in Fig. 5, such as when the filter is seated in the vessel 11.

To facilitate alignment of the filter in the vessel, annularly spaced axially extending projections 38 are shaped to be received in the well and engage the side wall 12. The projections extend outwardly from the ribs 24 on the same side of the screen 21 and beyond the beaded portion 36.

While a number of different methods may be utilized for assembling this structure, it is preferred that the marginal edges of the screen 21 be first disposed in the recess defined by the spaced sides 32 of the retaining member 31, and the sides 32 then rolled to cause them to grip the screen and expand the outside diameter of the screen retainer so as to stretch the screen taut. Thereafter, the hub portion 23, the spokes 24, and the rim 26 may be molded about the screen 21, as shown, to form a single unitary filter. It should be understood that the portions of the filter except the screen 21 and retaining member 31 are molded from any suitable material such as rubber, synthetic rubber, nylon, or other plastic materials. The molded material is molded to the screen and retaining member to define an integral structure.

For the purpose of maintaining the filter 20 in position in the vessel 11, there is provided a filter rod 28. This rod extends through the aperture or opening 27 in the hub portion 23. One end of the filter rod 28 is shaped to define a handle portion 39 and the opposite end of the filter rod is shaped to form a hook 41 engageable with the end 17 of the tube 14. A spring 42 acting between the hub portion 23 and the filter rod 28 normally applies a pressure to the filter for effecting a positive seating of the latter.

The manner of mounting the filter in the vessel 11 is readily apparent. Briefly, the filter is passed through the open mouth of the upper vessel so that the beaded portion 36 rests on the bottom of the vessel and encircles the well in the bottom thereof, the projections 38 engaging the circular side wall 12 to aid in seating and positioning the filter. A pressure is applied to the handle 39 of the filter rod 28 to compress the spring 42 and interlock the hook 41 with the end 17 of the tube 14. The force of the spring urges the central portion of the frame in the direction of the bottom 13. This flexes the web portion 37 which stores energy for urging the beaded portion 36 into tight engagement with the vessel when the filter is secured in position. The stored energy in the web portion is sufficiently great so that the beaded edge 36 is caused to conform to the configuration of the vessel and thereby assure a positive seal about the edges of the filter.

In the embodiment of the filter shown in Figs. 6 and 7, the filter has the same general construction, including the beaded portion 36 and the web portion 37, as described for the embodiment in Figs. 1 to 5. In this embodiment, however, the annular rim 41 is molded directly to the marginal edges 42 of a screen 43. It has been found, however, that due to the shrinkage of certain synthetic resinous material the screen 43 may not be stretched tautly across the segmental openings in the frame when the rim is molded directly to the marginal edges of the screen. Accordingly, the segments of the screen 43 between radial spokes 44 are displaced to one side of the plane of the marginal edges of the screen to stretch the screen tautly as shown in Fig. 7.

The embodiment of the invention shown in Fig. 8 has the same general construction as described for the embodiment shown in Figs. 1 to 5, including a beaded portion 48 and a web portion 49. In this embodiment, however, the rim 51 is formed with an upwardly facing recess 52 shaped to receive an annular or ring member 53 having a tongue-shaped cross section to secure a screen 54 on the frame. In assembling this form of the invention, the screen 54 is placed on top of the rim 51 so that the marginal edges of the screen overlie the annular recess 52. Thereafter, the annular locking member 53 is pressed downwardly into the recess along with the marginal edges of the screen. This construction not only assures that the screen is locked tightly into position with the rim, but also insures that the screen is in a taut condition.

In the modification described heretofore, all of the parts except the screen, and in the case of the modifications of Figs. 1 to 5 the retainer 31, were formed of molded material. Instead of having the spokes 24, the hub 23, and the positioning fingers 38 formed of molded material, a suitable metal frame may be employed in addition to the screen portion, and a rim and web of molded material integrally united therewith. Such an arrangement is disclosed in Figs. 9 to 12 of the drawings. In Fig. 9 there is illustrated a fragmentary portion of the upper vessel 11 with the corresponding parts thereof designated by the same reference numerals as in Fig. 1 of the drawings. Associated with the upper vessel 11 is the filter 60, which is a modification of the filter 20 described above. The filter rod 28 and the spring 42 associated therewith are designated by the same reference numerals in Fig. 9 as in Fig. 1 of the drawings.

Considering now specifically the filter 60, it comprises a frame or frame means including a screen retaining or supporting means 61, preferably formed of stainless steel. This means 61 may comprise a metal stamping including an annular rim portion 61a, a central hub portion 61b, and a plurality of radially extending spokes 61c which interconnect the rim 61a and hub 61b. The hub 61b is provided with a central aperture 62 for receiving the filter rod 28. At positions intermediate the spokes 61c, there are integrally formed with the annular rim portion 61a a plurality of positioning fingers 63. The positioning fingers 63 depend out of the plane of the rim portion 61a and the spokes 61c, as is clearly shown in Fig. 9 of the drawings, so that they may be received within the well defined by the circular side walls 12 of the vessel 11, as shown in Fig. 9. These positioning fingers 63 correspond to the fingers 38 described above. It will be appreciated that these fingers are sort of spring-like, and they will readily guide the filter 60 into position while it is being seated in the vessel 11. Preferably, the extreme ends of the fingers 63 are curved, as shown in Fig. 9 of the drawings, to facilitate the positioning of the filter 60. For a purpose which will become apparent as the following description proceeds, the rim portion 61a of the frame portion 61 is provided with a plurality of openings 64. These openings are indicated as being positioned at the junctions of the spokes 61c and the rim portion 61a, and also at the junctions of the fingers 63 and the rim portion 61a.

In accordance with the present invention, a suitable circular screen member 65 is supported by the screen supporting means 61. As illustrated, the screen 65 is of slightly larger diameter than the means 61, and the peripheral edge thereof is bent around the periphery of the screen supporting means 61, as indicated at 66 in Fig. 12 of the drawings. In this way the screen may be stretched taut and so held by the screen supporting means 61 so that the means 61 functions like the screen retaining means 31 referred to above. Preferably, the screen 65 is also of stainless steel wire woven into a screen of the order of 200 mesh.

In addition to the screen supporting means 61, the frame of the filter 60 includes a molded rim 67, preferably formed of a synthetic rubber or the like which completely encloses the rim portion 61a of the screen supporting means 61. The molded rim 67, furthermore, includes portions 67a which are molded into the openings 64, so that the screen 65 is engaged on both sides thereof by the molded material, and in fact portions of the molded material move into the interstices in the screen 65. With this arrangement the rim 67 becomes completely integral with the screen supporting means 61 and the screen 65, and will not become separated therefrom. The frame of the filter 60, therefore, really comprises the molded rim 67 and the screen supporting means 61.

As in the preceding embodiments, in order to insure a satisfactory seal, the rim 67 is provided with a depending web portion 68 for resiliently engaging the bottom of the vessel 11, as is clearly indicated in Fig. 9 of the drawings. The web portion 68 is stressed, by virtue of the energy stored in the spring 42, to maintain a good seal under all conditions.

The various modifications of filters described above have numerous advantages over prior art arrangements. For example, they provide a single unitary structure when complete which may be quickly, readily and thoroughly cleaned. Furthermore, these filters may be quickly and readily assembled, and will provide a very satisfactory seal. Where cloth or paper filters are employed, there is always the problem of assembling and disassembling a supporting mechanism. The rim integrally molded to the remaining filter parts provides a very sturdy construction having a long service life, and moreover provides a filter which can be constructed in an inexpensive manner.

While there have been illustrated and described several embodiments of the present invention, it will be apparent that numerous changes and modifications will occur to those skilled in the art. Accordingly, it is aimed in the appended claims to cover all those changes and modifications which fall within the true spirit and scope of the present invention.

What is claimed as new and desired to be secured by Letters Patent of the United States is:

1. A filter of the type adapted to be held in sealing relationship with a vessel of a coffee maker, comprising a screen of the type requiring tensile forces applied to the edges thereof to maintain the same in a taut condition, a frame for said screen including a rim formed of molded resilient material integrally united with said screen, a weblike extension of said rim molded integrally therewith and forming a resilient peripheral sealing member for engagement with said vessel, said frame including fingerlike members extending out of the plane of the screen for positioning said filter relative to said vessel.

2. A filter of the type adapted to be held in sealing relationship with a vessel of a coffee maker, comprising a screen of the type requiring tensile forces applied to the edges thereof to maintain the same in a taut condition, a frame for said screen including screen supporting means and a rim, at least said rim being formed of molded resilient material integrally molded to said screen so as to be inseparable therefrom, a weblike extension of said rim molded integrally therewith and forming a resilient peripheral sealing member for engagement with said vessel, said screen supporting means maintaining said screen taut even though said rim is formed of relatively resilient material.

3. In a filter of the type adapted to be forcibly seated in a vessel of a coffee maker, the combination of a screen shaped to span a bottom opening in the vessel, said screen being of the type requiring the application of tensile forces to the edges thereof to maintain the same in taut condition, metallic screen supporting means engageable with the marginal edges of the screen for maintaining the latter in a preselected taut condition, frame means formed of molded material molded to said screen supporting means and enclosing the same, to form an integral structure, one of said last two mentioned means comprising a hub portion disposed centrally of the screen and radial spokes extending outwardly from said hub portion, a flexible annular extension of said frame means formed integrally therewith shaped to encircle said opening, and releasable means for securing said filter in said vessel and operative to apply a pressure to said frame to stress the flexible annular extension to store energy therein for urging said extension into positive engagement with said vessel.

4. A filter for a coffeemaking vessel comprising a metal screen supporting means having an annular rim portion and radially disposed spokes interconnecting said rim and a central hub portion, a screen supported on said frame and having the periphery thereof bent at least partially around the rim portion of said screen supporting means, and a non-metallic frame portion of molded material integrally united to said screen and rim portion and completely enclosing said rim portion, said non-metallic frame portion including an annular integral resilient extension for making sealing engagement with said vessel.

5. The filter of claim 4 wherein said annular rim portion is provided with openings to permit said molded material to enter and engage both sides of said screen at said openings thereby more firmly integrally uniting said frame portion, said rim portion and said metal screen.

6. The filter of claim 4 wherein said screen is woven of stainless steel wire and said screen supporting means is stainless steel.

7. A filter for a coffeemaking vessel comprising a metal screen supporting means having an annular rim portion and radially disposed spokes interconnecting said rim and a central hub portion, a screen supported on said frame and having the periphery thereof bent at least partially around the rim portion of said screen supporting means to hold said screen taut, and a non-metallic frame portion of molded material integrally united to said screen and rim portion and completely enclosing said rim portion.

8. In a filter of the type adapted to be forcibly seated in a vessel of a coffee maker, the combination of a screen shaped to span a bottom opening in the vessel, said screen being of the type requiring the application of tensile forces to the edges thereof to maintain the same in taut condition, metallic screen supporting means engageable with the marginal edges of the screen for maintaining the latter in a preselected taut condition, frame means formed entirely of molded material molded to said screen and said screen supporting means and substantially enclosing said screen supporting means thereby to define an integral structure, one of said last two mentioned means comprising a hub portion disposed centrally of the screen and radial spokes extending outwardly from said hub portion, a flexible annular extension of said frame means and formed integrally therewith of said molded material and shaped to encircle said opening, and releasable means for securing said filter in said vessel to span said bottom opening and operative to apply a pressure to said frame to stress the flexible annular extension to store energy therein for urging said extension into positive engagement with said vessel.

9. The filter of claim 1 wherein said fingerlike members are formed of molded resilient material molded integrally with said rim.

10. The filter of claim 1 wherein said frame comprises an annular ring portion molded to the marginal edges of said screen, a central hub portion molded to a central portion of the screen, and radial spokes extending between the hub portion and the annular ring portion and molded to the screen to define annularly spaced segmental filtering areas, said screen between adjacent spokes being displaced to one side of the plane of the marginal edges of the screen tautly to stretch the segmental areas of the screen.

References Cited in the file of this patent
UNITED STATES PATENTS

| | | |
|---|---|---|
| 1,329,398 | Hachmann | Feb. 3, 1920 |
| 1,989,034 | Anderson et al. | Jan. 22, 1935 |
| 2,127,397 | Freedlander | Aug. 16, 1938 |
| 2,345,265 | Jepson et al. | Mar. 28, 1944 |
| 2,388,335 | McCullough | Nov. 6, 1945 |
| 2,451,074 | Dean | Oct. 12, 1948 |
| 2,464,921 | Chandler | Mar. 22, 1949 |
| 2,472,955 | Myers | June 14, 1949 |
| 2,564,644 | Jepson | Aug. 14, 1951 |
| 2,653,717 | Storner | Sept. 29, 1953 |
| 2,738,073 | Jepson | Mar. 13, 1956 |